Figure 1:
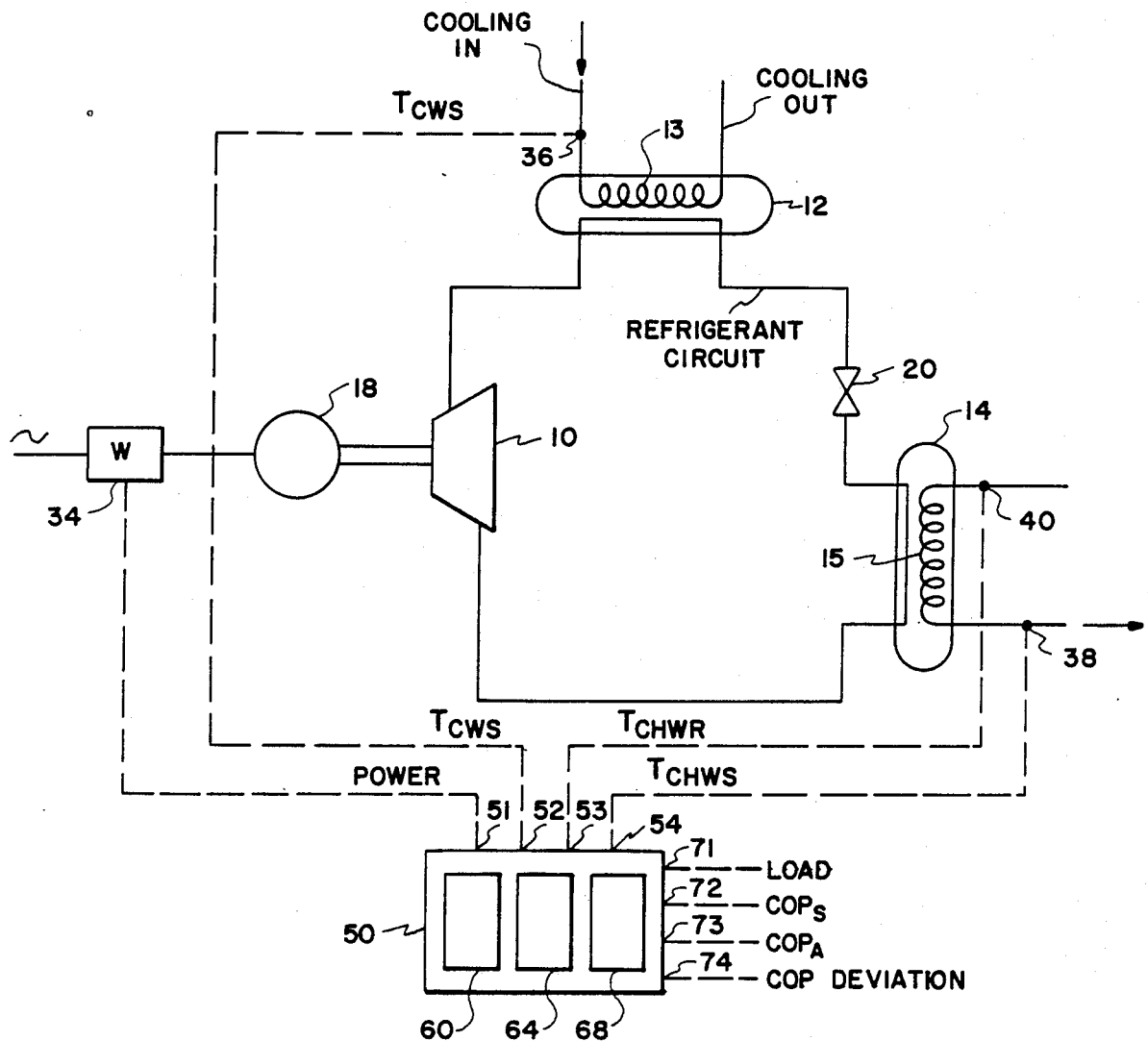

United States Patent [19]

Pearman

[11] Patent Number: 4,885,914

[45] Date of Patent: Dec. 12, 1989

[54] COEFFICIENT OF PERFORMANCE DEVIATION METER FOR VAPOR COMPRESSION TYPE REFRIGERATION SYSTEMS

[75] Inventor: Arthur N. J. Pearman, St. Paul, Minn.

[73] Assignee: Honeywell Inc., Minneapolis, Minn.

[21] Appl. No.: 315,238

[22] Filed: Feb. 14, 1989

Related U.S. Application Data

[63] Continuation of Ser. No. 104,691, Oct. 5, 1987, abandoned.

[51] Int. Cl.[4] ............................................. G01K 13/00
[52] U.S. Cl. .................................. 62/129; 364/551.01
[58] Field of Search ................ 62/125, 126, 127, 129; 165/11 R; 236/94; 364/551, 557, 506, 511; 374/39, 40, 41, 31; 73/112

[56] References Cited

U.S. PATENT DOCUMENTS

| | | | |
|---|---|---|---|
| 4,217,761 | 8/1980 | Cornaire et al. | 165/11.1 X |
| 4,325,223 | 4/1982 | Cantley | 62/127 X |
| 4,432,232 | 2/1984 | Brantley et al. | 62/127 X |
| 4,510,576 | 4/1985 | MacArthur et al. | 364/551 |
| 4,611,470 | 9/1986 | Enström | 62/127 |

*Primary Examiner*—Harry B. Tanner
*Attorney, Agent, or Firm*—Omund R. Dahle

[57] ABSTRACT

The invention relates to a coefficient of performance deviation meter for vapor compression type refrigeration systems. The measurement of the coefficient of performance of a mechanical vapor compression refrigeration system requires that the two parameters be known which are the input power and the heat absorbed or, conversely, the input power and the heat rejected. Manufacturers of vapor compression machines publish performance data on the power used versus the cooling effect at various condenser water supply temperature (Tcws) and various evaporator chilled water supply temperature (Tchws). These data can be used to calculate specific coefficients of performance (COPs) at various Tcws and Tchws. The meter has inputs connected to sensors in a vapor compression system which provide the data for the input power and the heat absorbed parameters. One input is connected to a wattmeter set in the compressor motor power supply circuit which provides the input power. A second input is connected to a sensor which monitors the temperature (Tcws) of the inlet of the condenser cooling water supply. Two other inputs are connected to sensors which monitor the temperature (Tchws and Tchwr) of the supply and return pipes of the load water chilled by the evaporator.

1 Claim, 3 Drawing Sheets

COEFFICIENT OF PERFORMANCE DEVIATION METER FOR VAPOR COMPRESSION TYPE REFRIGERATION SYSTEMS

This application is a continuation, of application Ser. No. 07/104,691, filed Oct. 5, 1987, abandoned.

This invention relates to a coefficient of performance deviation meter for vapor compression type refrigeration systems.

The measurement of the coefficient of performance of a mechanical vapor compression refrigeration system requires that two parameters be known. These parameters are the input power and the heat absorbed or, conversely, the input power and the heat rejected.

Manufacturers of vapor compression machines publish performance data on the power used versus the cooling effect at various condenser water supply temperatures (Tcws) and various evaporator chilled water supply temperatures (Tchws). These data can be used to calculate specific coefficients of performance (COPs) at various Tcws and Tchws.

The meter herein to which the invention pertains has inputs connected to sensors in a vapor compression system which provide the data for the input power and the heat absorbed parameters. One input is connected to a wattmeter set in the compressor motor power supply circuit which provides the input power. A second input is connected to a sensor which monitors the temperature (Tcws) of the inlet of the condenser cooling water supply. Two other inputs are connected to sensors which monitor the temperatures (Tchws and Tchwr) of the supply and return pipes of the load water chilled by the evaporator.

A modified or second embodiment of meter herein to which the invention pertains has one input connected to a wattmeter set in the compressor motor power supply circuit which provides the input power. A second input is connected to a sensor which monitors the temperature (Tchws) of the outlet of the load water chilled by the evaporator. Two other inputs are connected to sensors which monitor the temperatures (Tcws and Tcwr) of the supply and return pipes of the condenser cooling water.

The meter herein includes a microprocessor and ROM memory facilities. The performance data referred to above for any particular vapor compression machine is incorporated in the form of a look-up table into a ROM chip which is installed in the meter.

The meter has analog-to-digital conversion capabilities to facilitate converting analog signals from the sensors connected to the inputs to digital forms.

The first embodiment of the meter has four outputs, one of which is a load output related to the difference in temperature ($T_E$) between the supply and return lines of the chilled water flowing through the evaporator unit. A second output is the COPs (the specific coefficient of performance referred to above) which is accessed from the look-pp table for corresponding values in Tchws and Tcws.

A third output is the COPa (the actual COP of the unit being monitored) which is simply the calculated load divided by the power.

Finally, the fourth output is the COP deviation which is the COPa divided by the COPs wherein $$COP_{DEVIATION} \text{ equals } \frac{(COPs - COPa)100}{COPs}$$

The second embodiment of the meter has four outputs, one of which is a load output related to the difference in temperatures ($T_C$) between the supply and return lines of the cooling water flowing through the condenser unit minus the part supplied to the "compression" motor. A second output is the COPs (the specific coefficient of performance referred to above) which is accessed from the look-up table for corresponding values of Tchws and Tcws.

A third output of the second embodiment is the COPa (the actual COP of the unit being monitored) which is the calculated load divided by the power.

Finally, the fourth output of the second embodiment is the COP deviation which is the COPa divided by the COPs which is the same as in the first embodiment of the meter. Thus, $$COP_{DEVIATION} \text{ equals } \frac{(COPs - COPa)100}{COPs}.$$

A main object of the invention is to provide a new and improved meter for determining the coefficient of performance deviations for refrigeration type compression systems.

Other objects and advantages of the invention will become apparent from the following specification, appended claims and attached drawings.

Figure 2:
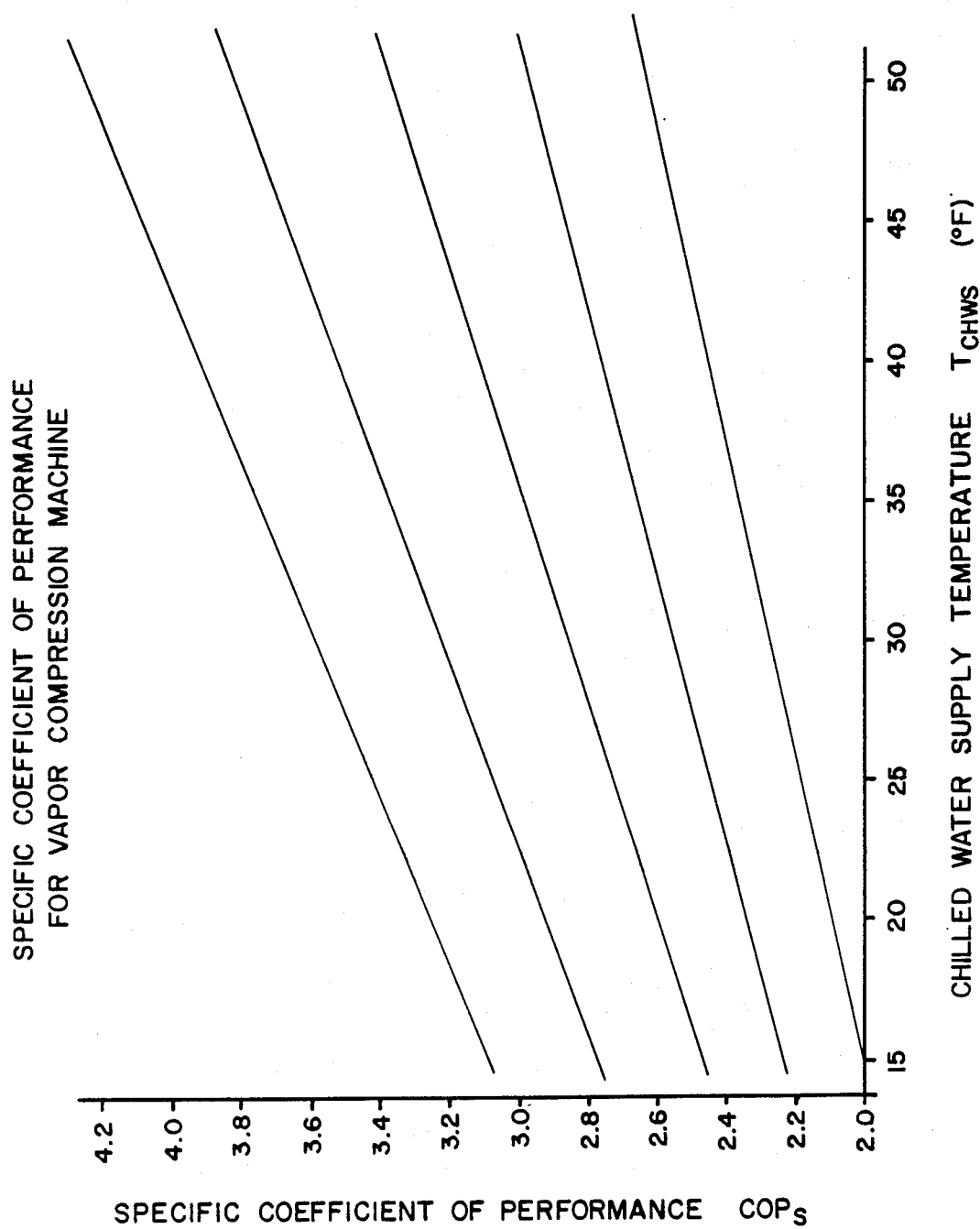
Figure 3:
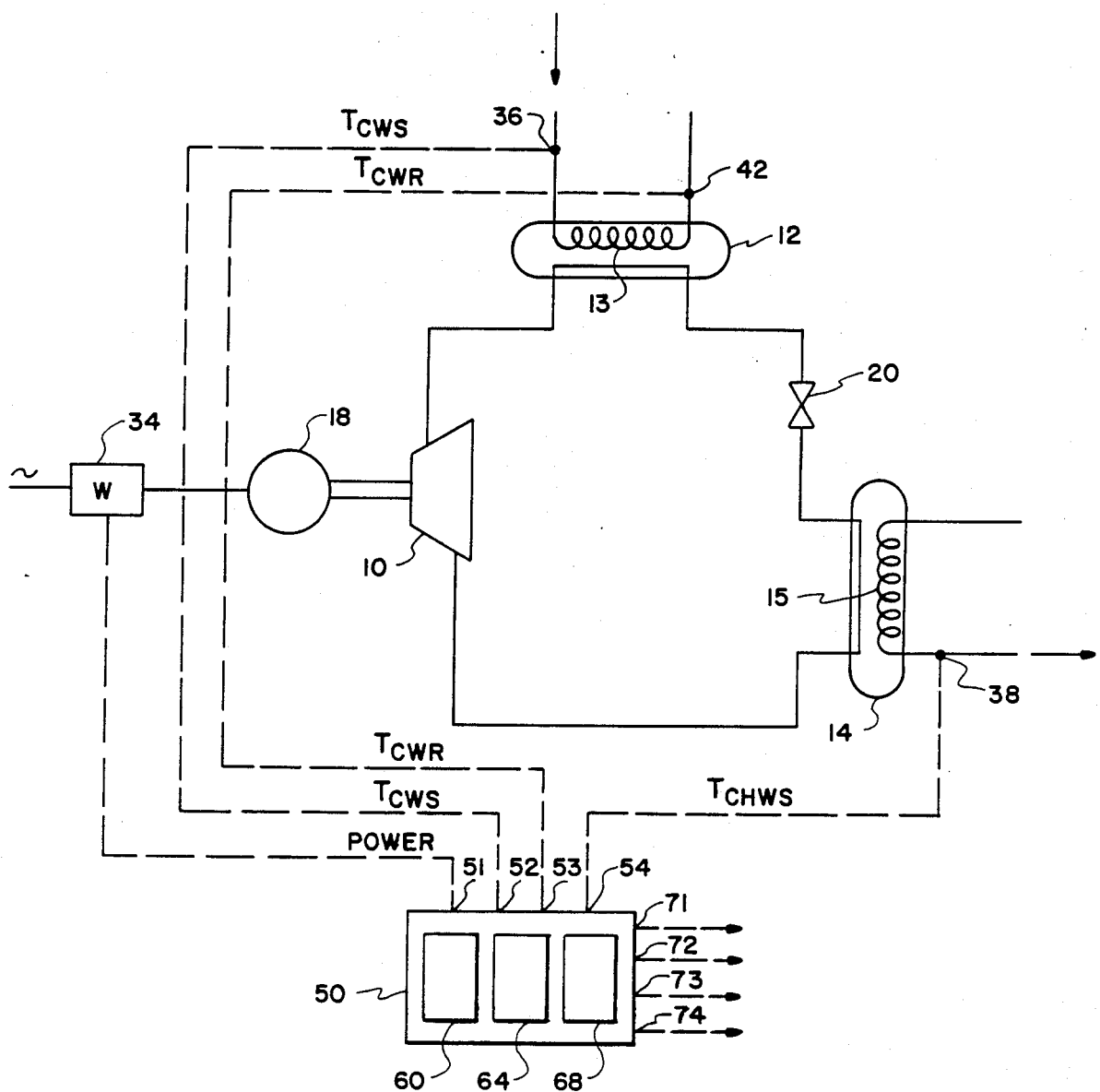

FIG. 1 is a schematic diagram of a vapor compression system and the connection thereto of a coefficient of performance deviation meter which embodies the invention;

FIG. 2 is a graph of an example calculated from published data of a manufacturer of a vapor compression machine which shows the specific coefficient of performance (COPs) at various condenser water supply temperatures (Tcws) and various evaporator chilled water supply temperatures (Tchws); and FIG. 3 is a schematic diagram of a vapor compression system and the connection thereto of a second embodiment of a coefficient of performance deviation meter which embodies the invention.

The illustration in FIG. 1 of a vapor compression system of the type to which the invention relates is a refrigerant fluid circuit which comprises a series arrangement of a compressor 10, a condenser unit 12 having a coil 13, and an evaporator unit 14 having a coil 15. The system includes an electric motor 18 for driving the compressor and an expansion valve 20 on the upstream side of the evaporator 14.

A coil 15 in evaporator unit 14 is in heat exchanging relation to the evaporator refrigerant and is utilized for the cooling load which may be a flow of water to and from the coil 15.

A coil 13 in condenser unit 12 is in heat exchanging relation to the condenser refrigerant and a flow of a fluid such as water to and from the coil 13 is utilized to extract heat from the refrigerant flowing in condenser unit 12. Coil 13 may be connected to a cooling tower or to some other means for extracting heat from the fluid flowing out of the coil 13.

A wattmeter 34 in the power line to the motor 18 measures the power supplied to the system. A sensor 36 monitors the temperature (Tcws) of the inlet of the condenser cooling water supply for the condenser unit 12. Sensors 38 and 40 monitor the temperatures (Tchws and Tchwr) of the supply and return lines respectively of the load water chilled in the evaporator unit 14.

A meter 50 to which the invention is directed has four input terminals 51, 52, 53 and 54 connected respectively to the wattmeter 34, sensor 36 and sensors 38 and 40. The meter includes computing means 60 such as a microprocessor and data storage means 64 such as a ROM. The meter also has a program storage facility 68 which may be RAM. The meter has four output terminals 71, 72, 73 and 74 which are LOAD, COPs, COPa and COP DEVIATION.

The introduction herein refers to performance data published by manufacturers of vapor compression machines. This performance data, which is published in the form of tables or graphs, plots the power used against the cooling effect at various Tcws and Tchws temperatures. An example of such performance data is shown in graph form in FIG. 2 for a vapor compression machine made by the Trane Company of LaCrosse, Wis., Model No. CGACD20E.

The particular data represented in FIG. 2 can be converted to a look-up table (not shown) in a ROM chip which is installed as the unit 64 in the meter 50.

Meter 50 is provided with or may be loaded with a program of a known kind which utilizes the procedure and equations described below to calculate the meter outputs from the sensed inputs during the operation of the vapor compression system. The program may be installed in EPROM in unit 68 from which it is loaded into RAM in unit 60 for execution at power up.

The meter 50 calculates the outputs in the following order:

$$\text{Load} = K(\text{Tchwr} - \text{Tchws})$$

where K is a factor used to convert units of temperature, water density and assumed water flow rate to load units as tons of cooling effect and to allow for precise flow rates found at the commissioning of the vapor compression machine. It is to be noted that a particular initializing procedure is required to obtain the load output if precise flow metering is desired to be avoided. As the flow rate for neither the cooling water for the condenser unit 12 or the chilled water for the evaporator unit 14 are usually not known, the machine is initially run until it appears to be performing correctly. The constant K is then adjusted and stored in memory.

In order to generate the output COPs the program will, at each predetermined time, find a COPs value from the ROM look-up table which corresponds to the Tcws and Tchws values sensed by sensors 36 and 38 at that time. The output COPs is then the coefficient which corresponds to a particular combination of Tcws and Tchws temperature values as illustrated in the graph of FIG. 2.

The actual coefficient of performance COPa is calculated by dividing the calculated load by the power used. Thus:

$$\text{COPa} = K \text{ (Calculated Load/Power)}$$

where the constant K is used to reconcile units of cooling and motor power.

Finally, the coefficient of performance deviation is calculated by subtracting the COPa from the COPs, dividing the result by COPs and multiplying by 100. Thus:

$$\text{COP deviation} = 100(\text{COPs} - \text{COPa})/\text{COPs}$$

A second similar method shown in FIG. 3 utilizes the condenser water return temperature Tcwr instead of the chilled water return temperature Tchwr to define the heat rejected instead of the load directly.

The only differences of FIG. 3 relative to FIG. 1 are (1) that a sensor 42 is provided in the condenser return line for Tcwr, (2) the evaporator supply line sensor 40 is not included, and (3) a meter input terminal 54' for Tcwr is substituted for the meter input terminal 54.

In this case the calculations become:

$$\text{Load} = K \text{ (Tcwr} - \text{Tcws)} - \text{Power}$$

$$\text{COPs} = \text{Same look-up table}$$

$$\text{COPa} = (K \text{ (Tcwr} - \text{Tcws)} - \text{Power}) / \text{Power}$$

or by simplifying $$\text{COPa} = K \text{ (Tcwr} - \text{Tcws)/Power)} - 1$$

$$\text{COP deviation} = \text{as before}$$

I claim:

1. A meter for determining the deviation of the actual coefficient of performance value (COPa) relative to the optimum coefficient of performance value (COPs) of a vapor compression type refrigeration system having components including power supply and power measuring means, condenser water supply and return lines and evaporator chilled water supply and return lines, said meter comprising, a chassis, input terminal means on said chassis for receiving input data from said components, a first temperature sensor electrically connected to said input terminal means and being connectable to said condenser water supply line, a second temperature sensor electrically connected to said input terminal means and being connectable to said evaporator chilled water supply line, means connecting said power measuring means to said input terminal means, data means for said meter including a plurality of sets of manufacturer's performance data for a corresponding plurality of vapor compression systems, said set of performance data being for the power used versus the cooling effect at various condenser water supply temperature (Tcws) and various evaporator chilled water supply temperatures (Tchws), data storage means for said meter in the form of loop-up-tables for said sets of performance data in respective ROM chips which are selectively connectable to said meter, computing means for said meter, program storage means for said meter for storing a program for calculating specific coefficients of performance (COPs) based on said manufacturer's performance data for ordered pair of values of said Tcws and said Tchws read from said input terminal means, and output terminal display means on said chassis for displaying said COPa and said COPs.

* * * * *